United States Patent
Sotto et al.

(10) Patent No.: US 12,040,641 B2
(45) Date of Patent: Jul. 16, 2024

(54) SYSTEMS AND METHODS FOR SITUATIONAL SUPPRESSION OF OVERCURRENT PROTECTION

(71) Applicant: Appleton Grp LLC, Rosemont, IL (US)

(72) Inventors: John Perloe Martinez Sotto, Marikina (PH); Archie Boy Mendoza Magsombol, Batangas (PH); Jonathan Art Fulgencio Recaflanca, Quezon (PH); Roderick Perez De Castro, Batangas (PH)

(73) Assignee: Appleton Grp LLC, Rosemont, IL (US)

(*) Notice: Subject to any disclaimer, the term of this patent is extended or adjusted under 35 U.S.C. 154(b) by 515 days.

(21) Appl. No.: 17/354,275

(22) Filed: Jun. 22, 2021

(65) Prior Publication Data
US 2022/0407333 A1    Dec. 22, 2022

(51) Int. Cl.
*H02J 7/00* (2006.01)
*H02J 1/10* (2006.01)
*H02J 5/00* (2016.01)

(52) U.S. Cl.
CPC ........ *H02J 7/00304* (2020.01); *H02J 7/0036* (2013.01); *H02J 1/106* (2020.01); *H02J 5/00* (2013.01)

(58) Field of Classification Search
CPC .................................................. H02J 7/00304
USPC ........................................................ 320/134
See application file for complete search history.

(56) References Cited

U.S. PATENT DOCUMENTS

| | | | |
|---|---|---|---|
| 6,574,124 B2 | 6/2003 | Lin et al. |
| 6,788,036 B1 | 9/2004 | Milavec et al. |
| 6,795,009 B2 | 9/2004 | Duffy et al. |
| 7,518,264 B1 | 4/2009 | Malik et al. |
| 8,120,205 B2 | 2/2012 | Heineman |
| 8,487,477 B2 | 7/2013 | Heineman |
| 8,552,704 B2 | 10/2013 | Kiadeh et al. |
| 8,645,726 B2 | 2/2014 | Lee et al. |
| 8,810,217 B2 | 8/2014 | Malmberg et al. |
| 9,362,748 B2 | 6/2016 | Hsu et al. |

(Continued)

FOREIGN PATENT DOCUMENTS

EP    4250513 A1 *    9/2023    ............... H02J 3/38

OTHER PUBLICATIONS

UCD3138A Highly-Integrated Digital Controller for Isolated Power, Texas Instruments, Mar. 2015 (Rev. Feb. 2017).

*Primary Examiner* — Yalkew Fantu
(74) *Attorney, Agent, or Firm* — McDonnell Boehnen Hulbert & Berghoff LLP

(57) ABSTRACT

A includes a plurality of power supply units, a processor, and a non-transitory computer readable medium having instructions stored thereon that, when engaged by the processor, cause performance of a set of functions. The set of functions includes detecting an overcurrent of a first power supply unit of the plurality of power supply units. The set of functions includes determining that the overcurrent of the first power supply unit corresponds to current sharing between the plurality of power supply units. The set of functions includes in response to determining that the overcurrent of the first power supply corresponds to the current sharing, suppressing an overcurrent protection mode of the first power supply.

20 Claims, 6 Drawing Sheets

(56) References Cited

U.S. PATENT DOCUMENTS

| | | | |
|---|---|---|---|
| 9,373,979 B2 | 6/2016 | Ghosh et al. | |
| 9,407,145 B1 | 8/2016 | Burstein et al. | |
| 9,853,447 B2 | 12/2017 | Hung et al. | |
| 10,498,239 B2* | 12/2019 | Jiang | H02M 3/1584 |
| 2011/0254531 A1 | 10/2011 | Markowski | |
| 2014/0068299 A1* | 3/2014 | Koinuma | G06F 9/3836 |
| | | | 713/322 |
| 2014/0184165 A1* | 7/2014 | Takahashi | H01M 10/48 |
| | | | 429/90 |
| 2017/0117715 A1* | 4/2017 | Muccini | H02J 5/00 |

\* cited by examiner

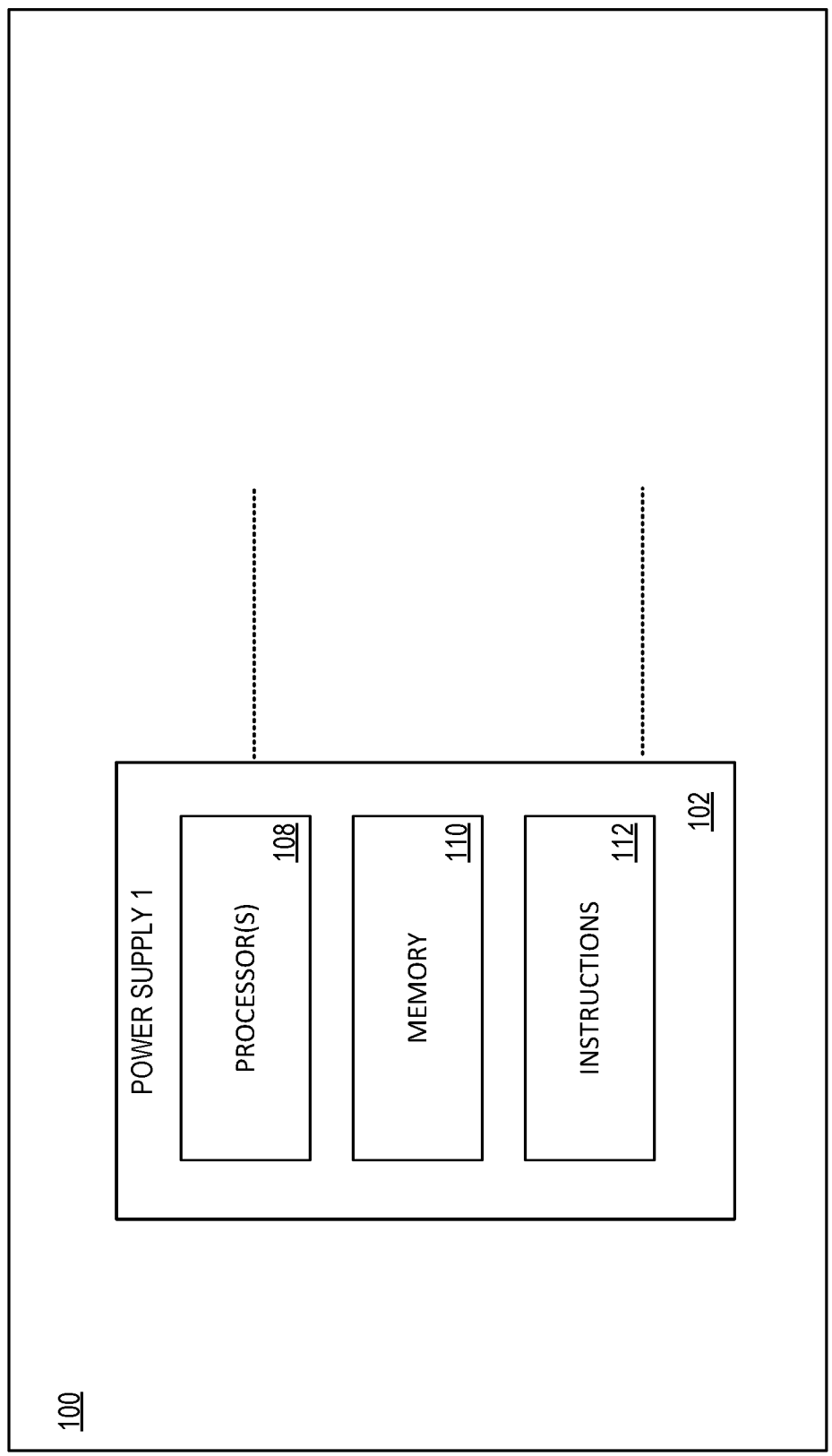

SYSTEMS AND METHODS FOR SITUATIONAL SUPPRESSION OF OVERCURRENT PROTECTION

BACKGROUND OF THE INVENTION

When two or more power supply units are connected in parallel to engage in current sharing, the total power output capability of the system increases, and the load capacity corresponding increases. However, during a startup phase of current sharing, each power supply unit may encounter a load that triggers overcurrent protection. In this case, the overcurrent protection will prevent the power supply units from outputting the required power to supply the load

SUMMARY

The present disclosure relates to systems and methods for suppressing unwanted triggering of overcurrent protection in a power supply unit. In particular, examples describe suppressing unwanted triggering of overcurrent protection based on determining that two or more power supply units are current sharing.

In one aspect, a system is described. The system includes a plurality of power supply units, a processor, and a non-transitory computer readable medium having instructions stored thereon that, when engaged by the processor, cause performance of a set of functions. The set of functions includes detecting an overcurrent of a first power supply unit of the plurality of power supply units. The set of functions includes determining that the overcurrent of the first power supply unit corresponds to current sharing between the plurality of power supply units. The set of functions includes in response to determining that the overcurrent of the first power supply corresponds to the current sharing, suppressing an overcurrent protection mode of the first power supply.

In a second aspect a method is described. The method includes detecting an overcurrent of a first power supply unit of a plurality of power supply units. The method includes determining that the overcurrent of the first power supply unit corresponds to current sharing between the plurality of power supply units. The method includes, in response to determining that the overcurrent of the first power supply corresponds to the current sharing, suppressing an overcurrent protection mode of the first power supply.

In a third aspect, a digital signal controller for a power supply unit is described. The digital signal controller includes a processor and a non-transitory computer readable medium having instructions stored thereon that, when engaged by the processor, cause performance of a set of functions. The set of functions includes detecting an overcurrent of the power supply unit. The set of functions includes determining that the overcurrent of the power supply unit corresponds to current sharing between the power supply unit and another power supply unit. The set of functions includes, in response to determining that the overcurrent of the power supply corresponds to the current sharing, suppressing an overcurrent protection mode of the power supply.

These, as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 1B depicts a first power supply unit of a plurality of power supply units, according to an example implementation.

DETAILED DESCRIPTION

Figure 1A:
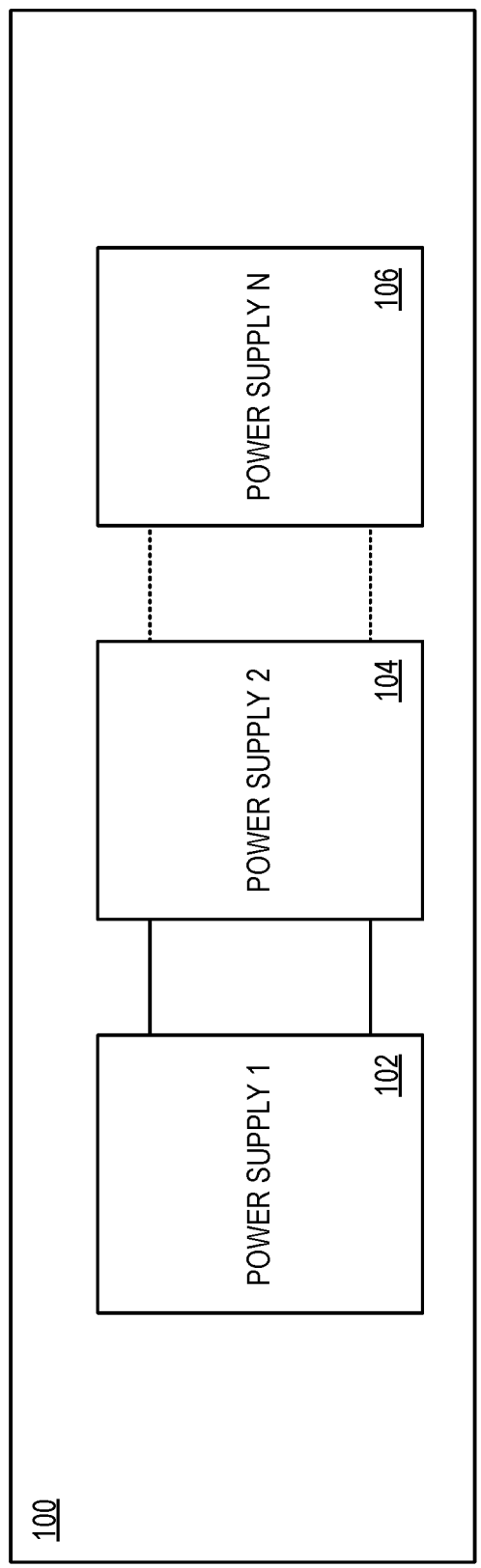
FIG. 1A depicts a plurality of power supply units, according to an example implementation.

Example methods and systems are described herein. The words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Within examples, a plurality of power supply units can be connected in parallel to implement current sharing. This allows the power supply units to combine their load capacities, allowing the system to supply larger loads. However, current sharing can also trigger current overprotection in one or more of the connected power supplies. For example, during a startup phase of the current sharing, a first power supply unit may encounter a load that is sufficiently low for the plurality of connected power supply units, but which is higher than the first power supply unit's load capacity. This causes the first power supply unit to engage overcurrent protection in order to preserve the first power supply unit's useful lifetime. For example, this protection may be embedded in the firmware of a digital signal controller of the first power supply unit.

While overcurrent protection is desirable in most contexts, in the current sharing context, overcurrent protection may delay the system in providing power to the load, or cause the system to fail to provide sufficient power to the load. For example, because the first power supply unit engages overcurrent protection, a second power supply unit may also engage overcurrent protection because the first power supply unit is not taking a share of the load. This seesaw effect of power supply units encountering an overly large load may continue ad infinitum or at least until both power supply units sync their startup phases.

These difficulties with overcurrent protection can be addressed by establishing feedback communications between the two or more current sharing power supply units. However, this two-way feedback requires additional pins in integrated circuits embedded in the power supply units, and may involve unnecessary manufacturing and assembly costs for the plurality of power supply units.

Examples described herein resolve these issues by allowing for situational suppression of overcurrent protection by a power supply unit. In particular, a firmware update for a digital signal controller of the power supply unit may allow for the power supply unit to detect scenarios in which overcurrent protection is being engaged due to current sharing between two or more power supply units. Each power supply unit can be a switch mode power supply unit, for example.

Within examples, a power supply unit detects an overcurrent based on being connected to an over-large load. The power supply unit then determines whether the overcurrent of corresponds to current sharing between a plurality of power supply units. If the power supply unit detects that the overcurrent corresponds to the current sharing, the power supply unit may suppress an overcurrent protection mode. This allows the power supply unit and other power supply units in the plurality to reach an appropriate current level for powering the load.

Within examples, determining whether the overcurrent corresponds to current sharing between a plurality of power supply units includes iteratively detecting an overcurrent of the power supply unit, incrementing an overcurrent counter each time an overcurrent is detected, and determining whether the overcurrent counter is greater than a debounce number associated with current sharing. Debouncing in this context relates to removing oscillations in current that result from engaging the overcurrent protection mode. If the counter is greater than the debounce number, it is determined that the overcurrent is not due to current sharing, and the power supply unit engages the overcurrent protection mode. By contrast, if the counter is less than the debounce number, the power supply unit determines to wait for one or more iterations to determine whether the overcurrent is no longer detected. The debounce number may be set based on a time per iteration and a maximum amount of allowable exposure of the power supply unit to the overcurrent. In this manner, the power supply unit can protect against damage from extended overcurrents while also allowing for additional time for adapting to current sharing contexts.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, and components, and circuits have not been described in detail so as not to unnecessarily obscure aspects of the embodiments.

FIG. 1A depicts a plurality of power supply units, according to an example implementation. In particular, FIG. 1A shows a plurality of power supply units 100 that includes a first power supply unit 102, a second power supply unit 104, and an n-th power supply unit 106. Individually, each power supply unit has an individual load capacity. Connecting the power supplies in parallel, as shown in FIG. 1A, allows for current sharing between the plurality of power supply units 100 that increases the load capacity. However, as described above, a startup phase of current sharing can result in execution of overcurrent protection in each of the power supply units. Systems and methods of addressing this issue are described further below.

FIG. 1B depicts the first power supply unit 102 of the plurality of power supply units 100, according to an example implementation. In particular, FIG. 1B shows that the first power supply unit includes processor(s) 108, a memory 110, and instructions 112. The processor(s) 108 may be general-purpose processors or special purpose processors corresponding to processing visual communication signals. The processor(s) 108 can be configured to engage the instructions 112 (e.g., computer-readable program instructions) that are stored in the memory 110 and are executable to provide the functionality of the first power supply unit 102 or related systems.

The memory 110 includes computer-readable storage media that is accessible and executable by the processor(s) 108. The memory can include volatile and/or non-volatile storage components, such as optical, magnetic, organic or other memory or disc storage, which can be integrated in whole or in part with the processors. For example, the memory can correspond to firmware of a digital signal controller of the first power supply unit 102. For example, the firmware is held in a non-volatile memory device such as ROM, EPROM, EEPROM, or flash memory of a digital signal controller. Accordingly, the memory is considered non-transitory computer readable media. Instructions executable by the one or more processor are stored on the memory 110. The instructions 112 include computer-executable code.

Figure 2:
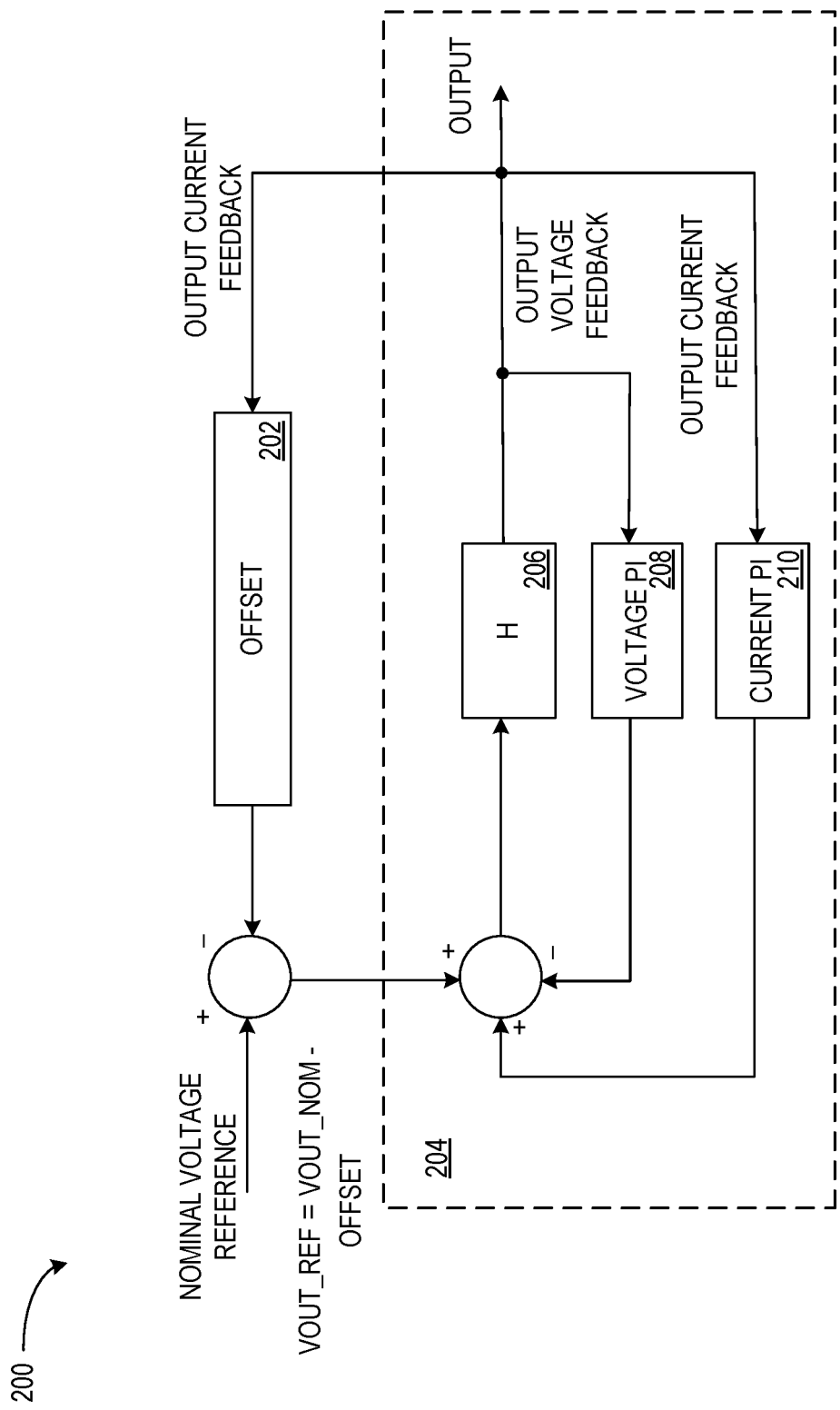
FIG. 2 depicts a feedback diagram of a power supply unit, according to an example implementation.

FIG. 2 depicts a feedback diagram of a power supply unit, according to an example implementation. In particular, FIG. 2 shows a feedback diagram 200 that facilitates voltage droop control of a power supply unit such as an AC-DC or DC-DC converter. The example shown in FIG. 2 illustrates feedback during current sharing and in the presence of an increased load. FIG. 2 shows an offset 202 for use as feedback to the system and a dual feedback loop 204. For example, the dual feedback loop 204 may be suitable for a DC-DC converter. The dual feedback loop 204 includes a transform 206, a voltage proportional integral controller 208, and a current proportional integral controller 210. The offset 202 is derived based on an output of the transform 206. The transform 206 also receives feedback from the voltage proportional integral controller 208 and the current proportional integral controller 210. In sum, droop control of the offset 202 results in $VOUT_{REF}=VOUT_{NOM}-k(I_{OUT}-I_{MAX}/2)$ where $k=V_{DROOPMAX}/I_{MAX}$, $VOUT_{REF}$ is the reference voltage of the DC-DC feedback loop, $VOUT_{NOM}$ is the nominal voltage when there is no current sharing, k is the droop voltage coefficient, $I_{OUT}$ is the output load current in a power supply unit, $I_{MAX}$ is the maximum allowable current sharing per power supply unit, and $V_{DROOPMAX}$ is the maximum allowable swing in the output voltage of the power supply unit.

In an example scenario of the feedback diagram 200, drooping control of the power supply unit allows for effecting current sharing. However, during transition events such as a startup phase of current sharing between a plurality of power supply units may present difficulties. In an illustrative example scenario, two 10 A power supply units connected in parallel and are configured to share a current in order to share a 20 A load. Starting the two power supply units concurrently should allow for the power supply units to share the load equally, but, for example, if one power supply unit starts slightly before the other, the first power supply unit is expected to carry the 20 A load on its own. This causes the first power supply the engage an overcurrent protection mode in which the first power supply unit turns off or switches on and off periodically over a period of time. Because the first power supply unit engages the overcurrent protection mode, the second power supply unit is similarly expected to carry the entire 20 A load, and similarly results in the second power supply unit engaging an overcurrent protection mode.

Accordingly, while a feedback loop with drooping control, such as that depicted in FIG. 2, may typically be sufficient on its own to facilitate current sharing between a plurality of power supply units some context may arise that prevent effective current sharing. Examples are described in FIG. 3 that assist in overcoming these difficulties.

Figure 3:
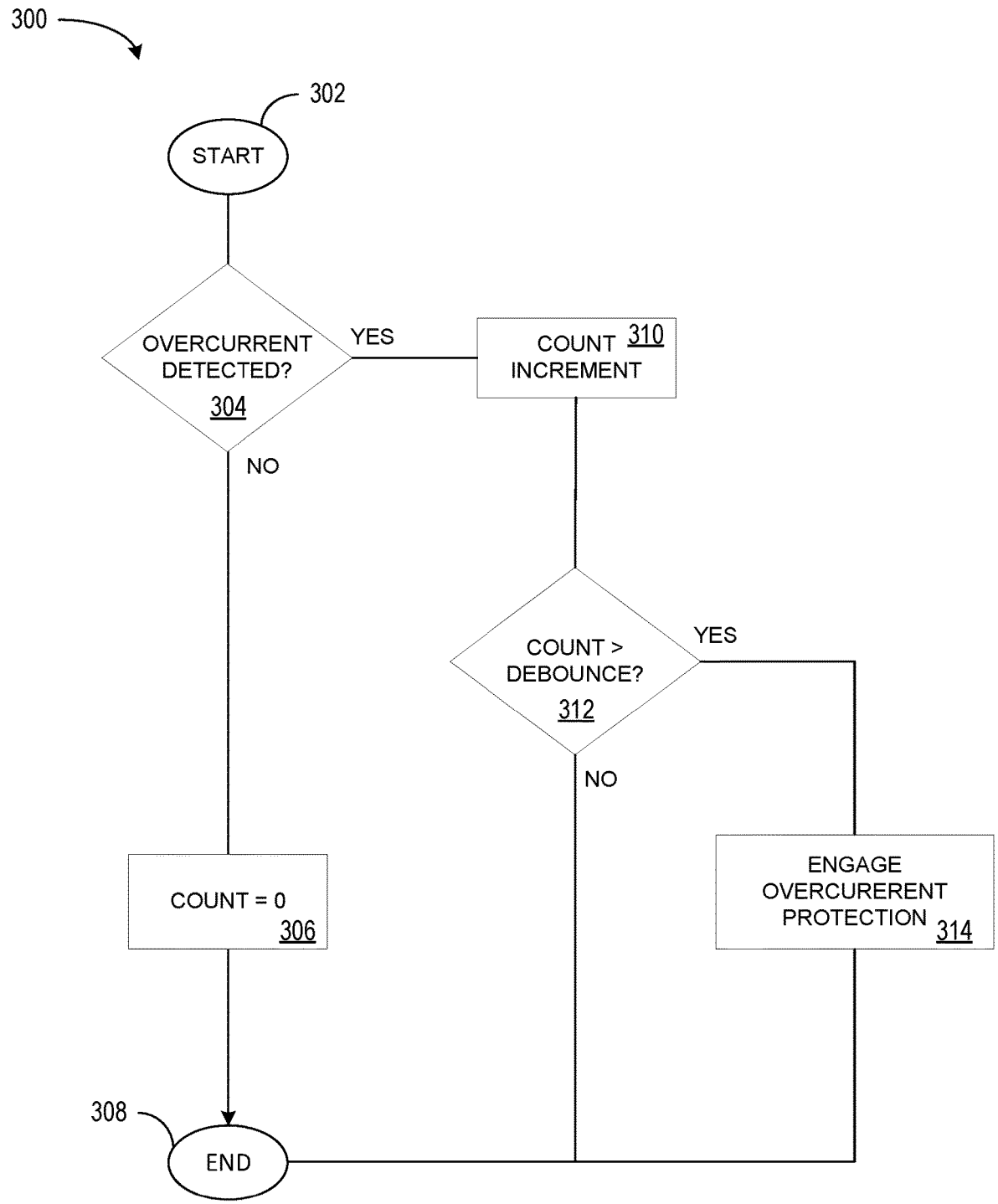
FIG. 3 depicts a portion of a state machine of a digital signal controller, according to an example implementation.

FIG. 3 depicts a portion of a state machine of a digital signal controller, according to an example implementation. In particular, FIG. 3 shows a flow chart of a method 300 for automatically detecting current sharing contexts of a power supply unit experiencing overcurrents. The method 300 includes a start point 302. The start point 302 may be a module in a state machine that is periodically revisited by a digital signal controller of a power supply unit. For example, the start point 302 is the beginning of an iterative process used for identifying current sharing contexts of the power supply unit.

At decision block 304, the method 300 includes determining whether an overcurrent is detected. For example, this may involve detecting a larger current than expected given a load capacity of a power supply unit. A current level outputted by the power supply unit may be compared to an overcurrent threshold to detect the overcurrent or lack thereof. A larger current may indicate that the power supply unit is connected to a relatively large load without the contribution of another power supply unit. For example, this may occur in the context described above with respect to FIG. 2, or this may occur if a load of the power supply unit changes for another reason. If an overcurrent is not detected, the method 300 progresses to block 306, which sets an overcurrent detection count to zero. This signifies in subsequent iterations that this iteration found no overcurrent. Finally, the method 300 progresses to an end point 308, which completes the iteration.

If an overcurrent is detected, the method 300 progresses from decision block 304 to block 310. At block 310, the method 300 includes increments the overcurrent detection count. This signifies the number of successive iterations in which an overcurrent is detected. The method 300 progresses from block 310 to decision block 312. At decision block 312, the overcurrent detection count is compared to a debounce number. The debounce number is a threshold number that relates to avoiding oscillations in current resulting from a previously engaged overcurrent protection mode. The debounce number can be determined based on a timer per iteration of the method 300 (e.g., using an average iteration time) and a maximum amount of time for exposing the power supply unit to overcurrent. If the overcurrent detection count exceeds the debounce number, the power supply unit determines that the overcurrent detection is not due to current sharing and method 300 moves on to block 314. At block 314, the method 300 includes executing the overcurrent protection mode. As described above, this involves turning the power supply unit off, or toggling the power supply on and off periodically. In this manner, after waiting for a threshold number of iterations, the method 300 proceeds with protecting the power supply unit from overcurrents.

If the current detection count does not exceed the debounce number, the power supply unit does not engage the overprotection mode, and the method 300 proceeds to end point 308. If, at the next iteration, the decision block 304 does not detect overprotection, then it is determined that the overcurrent was due to current sharing, and the power supply unit is allowed to settle to a lower current level. Accordingly, determining that an overcurrent is associated with current sharing between a plurality of power supply units may involve, at a first iteration, determining that an overcurrent detection count is greater than zero but less than a debounce number, and, at a second iteration, detecting no overcurrent of the power supply current. Further details regarding this process are illustrated in FIG. 4B.

Implementing the process shown in FIG. 3 into firmware of a power supply unit allows for a closed-loop feedback mechanism for each power supply unit that detects current sharing without communications between multiple power supply units. This reduces the number of connections between elements of a system, and potentially frees up pins in digital signal controllers of each power supply unit. This framework can be implemented in AC-DC converters, DC-DC converters, quasi-resonant LLC converters, or another other power supply applications that involve a digital signal processor for power transfer.

Figure 4A:
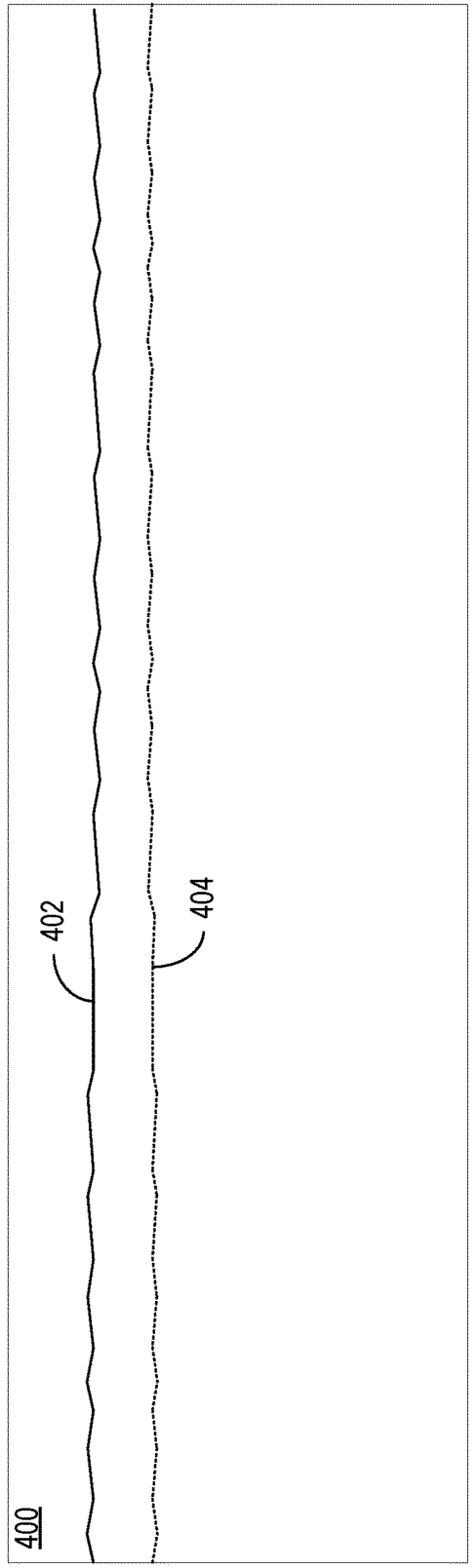
FIG. 4A depicts a current output of two power supply units in a first context, according to an example implementation.

FIG. 4A depicts a current output of two power supply units in a first context, according to an example implementation. In particular, FIG. 4A shows a graph 400 of a first current output level 402 of a first power supply unit and a second current output level 404 of a second power supply unit during a steady state of current sharing. In the example depicted in FIG. 4A, the power supply units are current sharing using the above-described closed-loop feedback framework to share the load. In a steady state, the first current output level 402 of the first power supply unit and the second current output level 404 of the second power supply unit are nearly identical (e.g., sharing the load within 5% of one another).

Figure 4B:
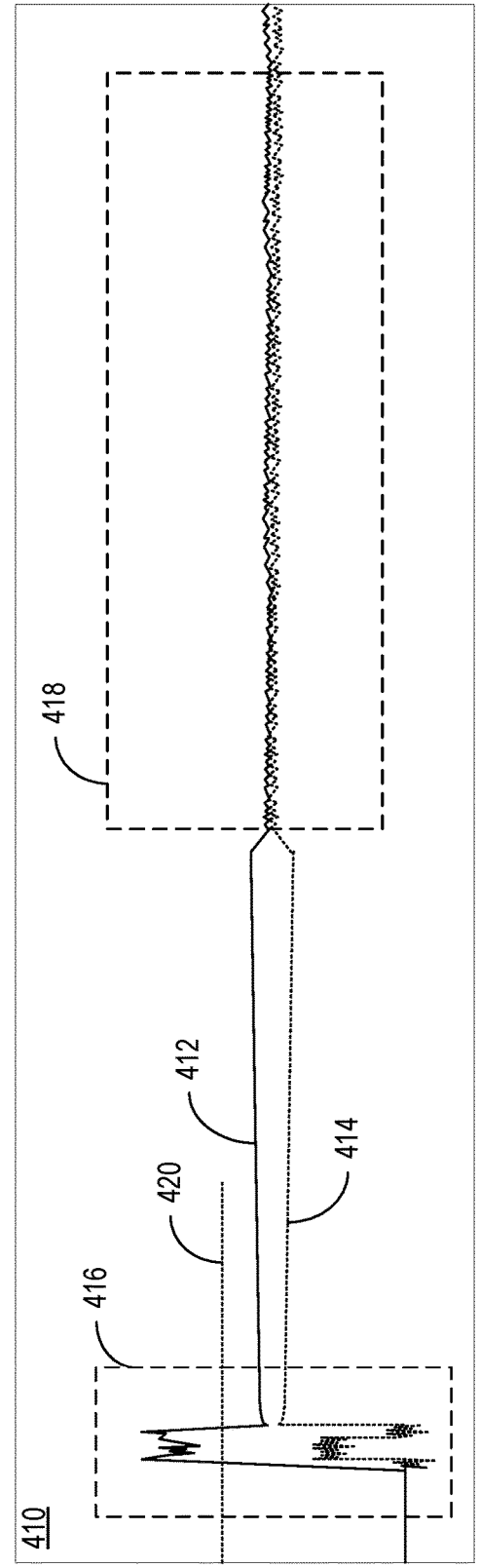
FIG. 4B depicts a current output of two power supply units in a second context, according to an example implementation.

FIG. 4B depicts a current output of two power supply units in a second context, according to an example implementation. In particular, FIG. 4B shows a graph 410 of a first current output level 412 of a first power supply unit and a second current output level 414 of a second power supply unit during a startup phase 416 and during a steady state phase 418 of current sharing. As shown in FIG. 4B, during the startup phase 416, the first power supply unit turns on earlier than the second power supply unit, and accordingly has a relatively high current level (e.g., above a threshold current 420). However, instead of engaging an overcurrent protection mode, the first power supply unit iterates through the method 300 multiple times to verify whether the overcurrent corresponds to the startup phase 416. Before the overcurrent detection count exceeds the debounce number, the startup phase 416 ends and the overcurrent falls below the threshold current 420. The currents then converge until becoming nearly identical at the steady state phase 418.

Figure 5:
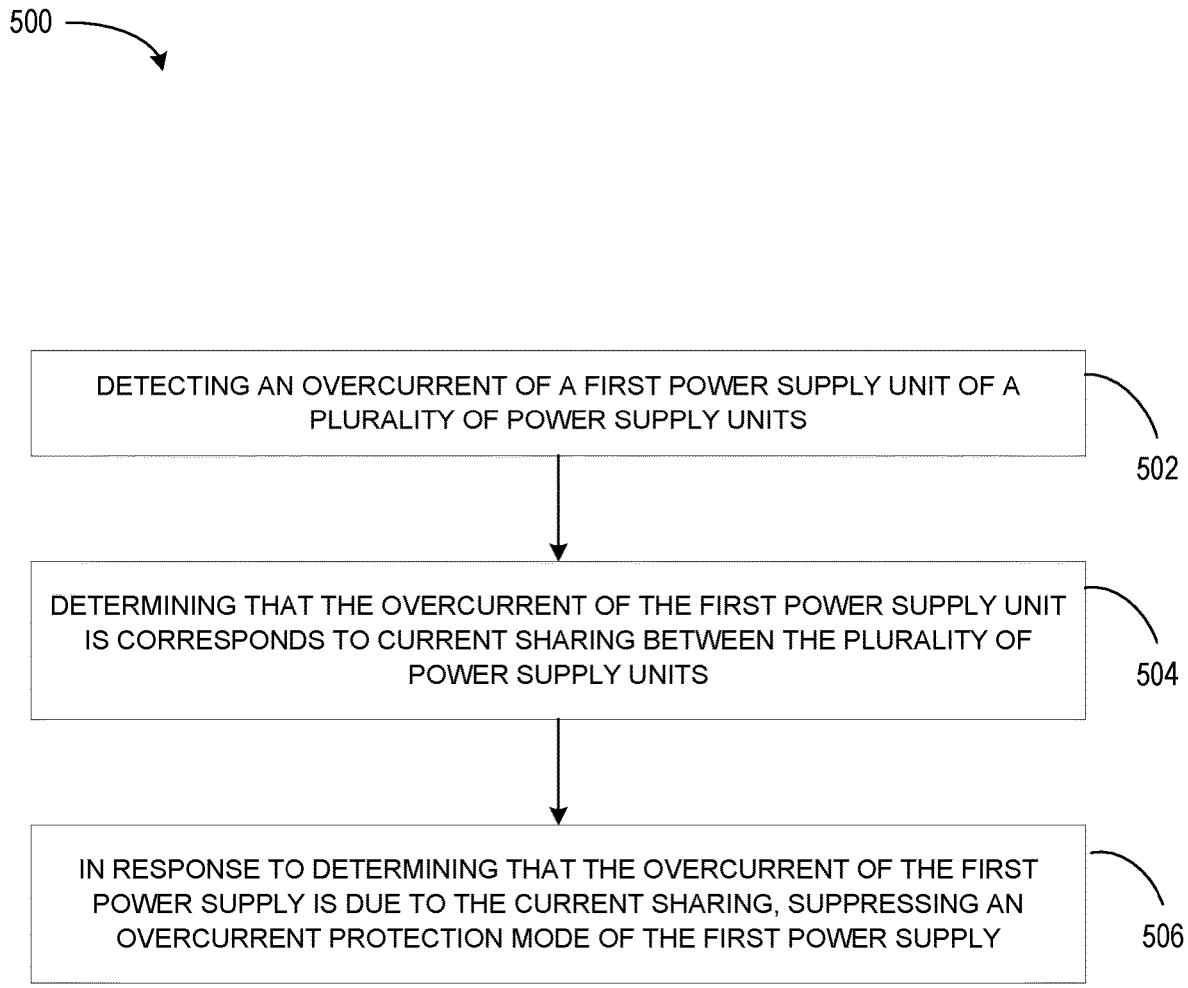
FIG. 5 depicts a flowchart of a method, according to an example implementation.

FIG. 5 depicts a flowchart of a method 500, according to an example implementation. The method 500 shown in FIG. 5 presents an example of a method that could be used with a plurality of power source units, such as the plurality of power supply units 100. Further, devices or systems may be used or configured to perform logical functions presented in FIG. 5. The method 500 may include one or more operations, functions, or actions as illustrated by one or more of blocks 502-506. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

For this and other processes and methods disclosed herein, flowcharts show functionality and operation of one possible implementation of present examples. Each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 5, and within other processes and methods disclosed herein, may represent circuitry that is wired to perform the specific logical functions in the process. For example, an MCU, special-purpose processor, analog control circuitry, or the like can be used to carry out the blocks described in relation to method 500. Alternative implementations are included within the scope of the examples of the present disclosure in which functions may be engaged out of order from that shown or discussed, including substantially concurrent or in reverse order, depending on the functionality involved, as would be understood by those reasonably skilled in the art.

At block 502 the method 500 includes, detecting an overcurrent of a first power supply unit of a plurality of power supply units. For example, this may include comparing an output current of the first power supply unit to a threshold current. The threshold current may correspond to a maximum load rating of the first power supply unit, and connecting the first power supply unit to a load that is larger than the maximum rating may result in the load pulling a current that is above the threshold level.

At block 504, the method 500 includes determining that the overcurrent of the first power supply unit corresponds to current sharing between the plurality of power supply units. For example, this may be performed as described above with respect to FIG. 3. In these examples, the method 500 may be associated with instructions embedded in firmware of the first power supply unit, and the steps of method 500 may be carried out based on instructions stored in the firmware.

At block 506, in response to determining that the overcurrent of the first power supply corresponds to the current sharing, suppressing an overcurrent protection mode of the first power supply. For example, though the first power supply unit may typically engage the overcurrent protection mode each time the output current surpasses the threshold current, the first power supply unit may instead delay engaging the overcurrent protection mode until completing the method 300.

Within examples, the method 500 further includes, in parallel with detecting the overcurrent of the first power supply unit, detecting an overcurrent of a second power supply unit of the plurality of power supply units. For example, a second power supply unit may also detect an overcurrent during a startup phase. The method 500 may further includes determining that the overcurrent of the second power supply unit corresponds to current sharing between the plurality of power supply units, and, in response to determining that the overcurrent of the second power supply corresponds to the current sharing, suppressing an overcurrent protection mode of the first power supply.

Accordingly, at a system level, multiple power supply units may perform the method 300 in parallel to determine whether an overcurrent is associated with current sharing of the power supply units. In alternative examples, such as that shown in FIG. 4B, a first power supply unit may detect an overcurrent, and a second power supply unit may not detect an overcurrent.

Within examples determining that the overcurrent of the first power supply unit corresponds to current sharing between the plurality of power supply units includes delaying engaging the overcurrent protection mode, and, while delating engaging the overcurrent protection mode, determining that an output current has decrease to a current level below a threshold overcurrent level of the first power supply unit. For example, this may be carried out as shown in FIG. 4B with respect to the first power supply unit.

Within examples, determining that the overcurrent of the first power supply corresponds to current sharing between the plurality of power supply units includes iteratively detecting an overcurrent of the first power supply unit, incrementing an overcurrent counter each time an overcurrent is detected, determining that the overcurrent counter is less than a debounce number associated with current sharing. For example, this may be carried out as described above with respect to FIG. 3.

In related examples, the method 500 further includes, prior to determining that the overcurrent counter is less than the debounce number, executing the overcurrent protection mode of the first power supply in response to determining that the overcurrent counter is greater than the debounce number associated with current sharing. Accordingly, within examples, the first power supply unit may determine that the overcurrent does not correspond to current sharing at a first time, and may determine that the overcurrent does correspond to current sharing at the second time.

In related examples, the method 500 includes setting the debounce number based on a time per iteration and a threshold time for exposing the first power supply unit to the overcurrent, wherein each iteration corresponds to detecting the overcurrent of the first power supply unit.

Within examples, determining that the overcurrent of the first power supply corresponds to current sharing between the plurality of power supply units includes, during a first iteration, detecting an overcurrent of the first power supply unit, incrementing an overcurrent counter in response to detecting the overcurrent, determining that the overcurrent counter is less than a debounce number associated with current sharing, and during a second iteration directly following the first iteration detecting no overcurrent of the first power supply unit. For example, this may be carried out as described above with respect to FIG. 3.

Thus, the described embodiments provide systems and methods that reliably facilitate current sharing between a plurality of power source units, thereby allowing for higher loads to be handled by a power supply system. Further, by embedding a process for vetting overcurrents in firmware of digital signal controller of a power source unit, each power source unit is capable of determining whether to engage an overcurrent protection mode without receiving feedback from another power source unit.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
a plurality of power supply units;
a processor; and
a non-transitory computer readable medium having instructions stored thereon that, when engaged by the processor, cause performance of a set of functions comprising:
detecting an overcurrent of a first power supply unit of the plurality of power supply units;
determining that the overcurrent of the first power supply unit corresponds to current sharing between the plurality of power supply units, wherein determining that the overcurrent of the first power supply unit corresponds to current sharing between the plurality of power supply units comprises:
iteratively detecting an overcurrent of the first power supply unit;
incrementing an overcurrent counter each time the overcurrent is detected; and
determining that the overcurrent counter is less than a debounce number associated with current sharing; and
in response to determining that the overcurrent of the first power supply unit corresponds to the current sharing, suppressing an overcurrent protection mode of the first power supply unit.

2. The system of claim 1, wherein the plurality of power supply units are connected in parallel.

3. The system of claim 1, wherein the plurality of power supply units are configured to share current without feedback information passing between the plurality of power supply units.

4. The system of claim 1, wherein each power supply unit comprises a switch mode power supply unit.

5. The system of claim 1, wherein the set of functions further comprises:
prior to determining that the overcurrent counter is less than the debounce number, executing the overcurrent protection mode of the first power supply unit in response to determining that the overcurrent counter is greater than the debounce number associated with current sharing.

6. The system of claim 5, wherein the set of functions further comprises:
setting the debounce number based on a time per iteration and a threshold time for exposing the first power supply unit to the overcurrent, wherein each iteration corresponds to detecting the overcurrent of the first power supply unit.

7. The system of claim 1, further comprising a DC-DC converter, wherein the DC-DC converter comprises the plurality of power supply units.

8. The system of claim 1, further comprising a AC-DC converter, wherein the AC-DC converter comprises the plurality of power supply units.

9. The system of claim 1, further comprising a quasi-resonant LLC converter, wherein the quasi-resonant LLC converter comprises the plurality of power supply units.

10. The system of claim 1, further comprising a digital signal controller, wherein the digital signal controller comprises the processor and non-transitory computer readable medium, wherein the non-transitory computer readable medium is firmware of the digital signal controller, and wherein the set of functions are part of a state machine embedded in the firmware.

11. A method, comprising:
detecting an overcurrent of a first power supply unit of a plurality of power supply units;
determining that the overcurrent of the first power supply unit corresponds to current sharing between the plurality of power supply units, wherein determining that the overcurrent of the first power supply unit corresponds to current sharing between the plurality of power supply units comprises:
iteratively detecting an overcurrent of the first power supply unit;
incrementing an overcurrent counter each time the overcurrent is detected; and
determining that the overcurrent counter is less than a debounce number associated with current sharing; and
in response to determining that the overcurrent of the first power supply unit corresponds to the current sharing, suppressing an overcurrent protection mode of the first power supply unit.

12. The method of claim 11, further comprising:
in parallel with detecting the overcurrent of the first power supply unit, detecting an overcurrent of a second power supply unit of the plurality of power supply units;
determining that the overcurrent of the second power supply unit corresponds to current sharing between the plurality of power supply units; and
in response to determining that the overcurrent of the second power supply unit corresponds to the current sharing, suppressing an overcurrent protection mode of the first power supply unit.

13. The method of claim 11, wherein determining that the overcurrent of the first power supply unit corresponds to current sharing between the plurality of power supply units comprises:
delaying engaging the overcurrent protection mode; and
while delaying engaging the overcurrent protection mode, determining that an output current has decrease to a current level below a threshold overcurrent level of the first power supply unit.

14. The method of claim 11, further comprising:
prior to determining that the overcurrent counter is less than the debounce number, executing the overcurrent protection mode of the first power supply unit in response to determining that the overcurrent counter is greater than the debounce number associated with current sharing.

15. The method of claim 14, further comprising:
setting the debounce number based on a time per iteration and a threshold time for exposing the first power supply unit to the overcurrent, wherein each iteration corresponds to detecting the overcurrent of the first power supply unit.

16. The method of claim 11, wherein determining that the overcurrent of the first power supply unit corresponds to current sharing between the plurality of power supply units comprises:
during a first iteration, detecting an overcurrent of the first power supply unit;
incrementing an overcurrent counter in response to detecting the overcurrent;
determining that the overcurrent counter is less than a debounce number associated with current sharing; and during a second iteration directly following the first iteration detecting no overcurrent of the first power supply unit.

17. A digital signal controller of a first power supply unit, comprising:
    a processor, and
    a non-transitory computer readable medium having instructions stored thereon that, when engaged by the processor, cause performance of a set of functions comprising:
        detecting an overcurrent of the first power supply unit;
        determining that the overcurrent of the first power supply unit corresponds to current sharing between the first power supply unit and a second power supply unit, wherein determining that the overcurrent of the first power supply unit corresponds to the current sharing comprises:
            iteratively detecting an overcurrent of the first power supply unit;
            incrementing an overcurrent counter each time the overcurrent is detected; and
            determining that the overcurrent counter is less than a debounce number associated with current sharing; and
        in response to determining that the overcurrent of the first power supply unit corresponds to the current sharing, suppressing an overcurrent protection mode of the first power supply unit.

18. The digital signal controller of claim 17, wherein the non-transitory computer readable medium is firmware of the digital signal controller, wherein the set of functions are part of a state machine embedded in the firmware.

19. The digital signal controller of claim 17, the set of functions further comprising:
    in parallel with detecting the overcurrent of the first power supply unit, detecting an overcurrent of a second power supply unit;
    determining that the overcurrent of the second power supply unit corresponds to current sharing; and
    in response to determining that the overcurrent of the second power supply unit corresponds to the current sharing, suppressing an overcurrent protection mode of the first power supply unit.

20. The digital signal controller of claim 17, wherein determining that the overcurrent of the first power supply unit corresponds to the current sharing comprises:
    delaying engaging the overcurrent protection mode; and
    while delaying engaging the overcurrent protection mode, determining that an output current has decrease to a current level below a threshold overcurrent level of the first power supply unit.

* * * * *